April 5, 1938.  K. C. D. HICKMAN  2,113,302
PROCESSES OF DISTILLATION
Filed March 5, 1936
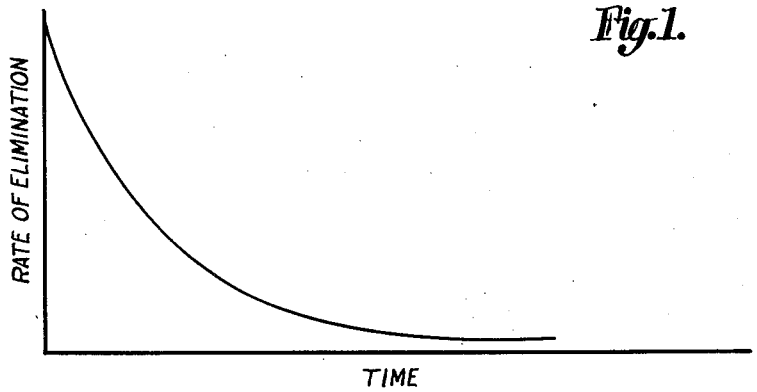
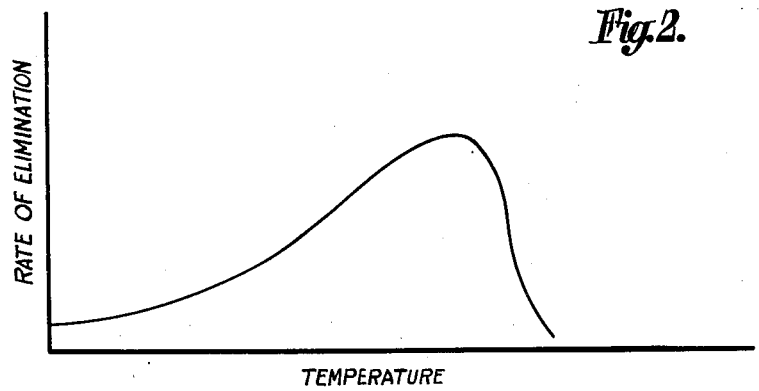
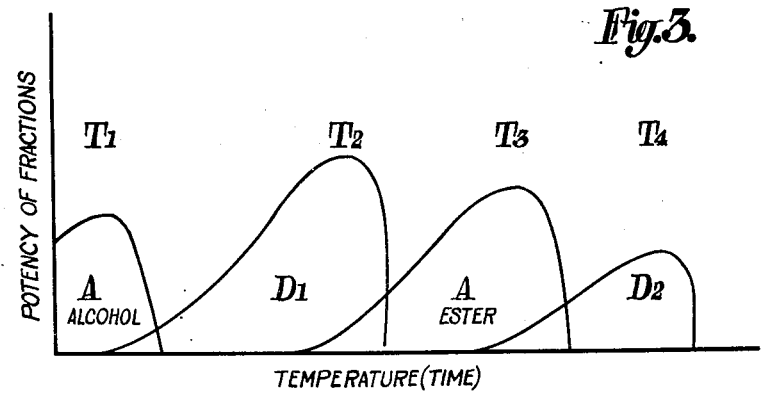
Kenneth C.D.Hickman,
INVENTOR:
BY
ATTORNEYS.

Patented Apr. 5, 1938

2,113,302

UNITED STATES PATENT OFFICE 2,113,302

PROCESSES OF DISTILLATION

Kenneth C. D. Hickman, Rochester, N. Y., assignor, by mesne assignments, to Eastman Kodak Company, Jersey City, N. J., a corporation of New Jersey Application March 5, 1936, Serial No. 67,332

11 Claims. (Cl. 202—52)

This invention relates to improvements in high vacuum distillation processes and more particularly to the distillation of difficultly volatilizable materials under molecular conditions.

The problem of distilling relatively non-volatile or difficultly volatile compounds has existed for a considerable period of time. In recent years processes of evaporative and molecular distillation have been developed which make possible economical distillation of such substances which previously could not be distilled or could not be distilled without undue decomposition. For example Burch U. S. Patent 1,955,321 discloses the evaporative distillation of high boiling hydrocarbons. Washburn "Bur. St. Jour. Res." vol. 2 (1929) 477 discloses evaporative distillation of such substances as paraffin wax and cane sugar. In my U. S. Patents 1,925,559 and 1,942,858 is disclosed the molecular distillation of animal and vegetable oils and fats to recover the fat soluble vitamin content thereof.

The processes of molecular distillation heretofore known have never enabled the fractionation or separation of the distillate into sharp cuts. The nature of such processes makes such a result practically impossible or very difficult to obtain for reasons readily understood.

Distillation under molecular conditions differs from distillation at higher pressures in that materials exhibit no definite boiling point and distillation of a particular substance from a mixture never ceases entirely if there is a temperature difference between the distilling and condensing surfaces. It is therefore difficult to identify a substance by the temperature at which it boils under a molecular vacuum. Molecular distillation is often employed to distill a mixture containing only small amounts of the desired distillate, such as vegetable and animal oils which contain vitamins in relatively small quantities and large amounts of inactive glycerides. During the distillation of such substances it will be found that a portion of the main bulk of the oil is simultaneously distilled. For instance in distilling vitamins from fish oils it is found that inactive material distills with the vitamins, the degree of concentration of the vitamins being greatest when the rate of distillation of the inactive substance is least. If a separation of such mixtures can be obtained at all by molecular distillation, that separation could be made all at one temperature. When operating in this manner it will be found that the highest rate of distillation of the vitamins would occur at the start and would gradually decrease. A very long time would be required to eliminate the main bulk of the potent material in this manner. This method of distillation is graphically illustrated in Fig. 1 where the rate of elimination is plotted against time.

In order to avoid such a slow rate of distillation it is usual practice to raise the temperature step by step during distillation. As the temperature increases the rate of distillation of the potent material increases to a maximum and then rapidly declines as a result of depletion of the distilland. Fig. 2 illustrates a curve of this type of distillation in which rate of elimination is plotted against temperature. It would appear at first sight that the maximum on this curve would represent the boiling point of the potent material. This idea is strengthened when two or more materials are distilled from a mixture. Thus in distilling cod-liver oil concentrates it is found that vitamin A alcohol, vitamin $D_1$, vitamin A ester and vitamin $D_2$ each yield potency maxima such as shown graphically in Fig. 3 in which potency of fractions is plotted against temperature. Whenever a given oil fraction is distilled under rigidly specified conditions in a given apparatus, the maxima occur at reproducible temperatures $T_1$, $T_2$, $T_3$ and $T_4$. When however, the fractions from the materials are redistilled or the conditions are altered, although the relative order of appearance of the maxima remains the same, the temperatures are situated in a different range. Each maximum represents, therefore, the temperature conditions under which the particular material is outdistancing the distillation of other materials to the greatest extent. It is identical with the boiling point only when there are no other materials left to outdistance; e. g. when the potent material is pure. In molecular distillation processes there is no assurance that a material distilling in maximum amount at a certain temperature in one experiment will do so in a subsequent one and it is seen therefore that the temperature of distillation cannot be used as a reliable means of indicating the character of a distillate.

This invention has for its object to overcome the uncertainties of hitherto known high vacuum distillation processes and to provide a process whereby the fractions are easily identified. Another object is to provide a process of molecular distillation which enables separation of relatively sharp fractions or cuts containing substantially all of the desired material. A further object is to provide a process of molecular distillation which enables separation of definite fractions without involving unreliable and laborious pressure determinations. A still further object is to provide a molecular distillation process which makes possible the separation of fractions having a definite composition. Other objects will appear hereinafter.

These objects are accomplished by the following invention which in its broader aspects comprises adding to a mixture to be subjected to high vacuum distillation an identifiable substance which on distillation will exhibit a maximum having a definite and known relation to the maximum distilling point of the fraction which it is desired to separate. Where several fractions are to be removed several identifiable substances exhibiting maxima having a definite relation to those of the desired fractions can be added. The identifying material distils over the same range or over a range having a definite relation to that of the desired compound or fraction and in this way gives a clear indication of the course of the distillation. The relation between the maxima of the desired fraction and the identifiable substance persists regardless of the distillation conditions and composition of the material distilled.

In the following examples and description, I have set forth several of the preferred embodiments of my invention, but it is to be understood that they are included merely for purposes of illustration and not as a limitation thereof.

Since it is a property of all individual substances to distil under true molecular conditions at a certain rate depending upon the temperature and their nature it is possible to incorporate in distilling mixtures traces of easily identifiable materials to serve as indicators. These will distil giving a maxima having a known relation to that of other difficultly identifiable substances which it is desired to recover as distillate. Whenever the easily identifiable substance is found in greatest concentration then the invisible substance is known to be present in the same fraction or one which is related to it in known manner.

Highly colored materials are generally the best distillation indicators. Thus, it is found that many of the simpler dyes distill excellently when dissolved in mixtures of high boiling oils, containing vitamins, hormones, sterols or fatty glycerides, etc. One dye or a mixture of dyes may be used. If three dyes be chosen, for instance, a red, a green, and a blue, having volatilities in this descending order, then if traces of these dyes are incorporated in the mixture of oils distilled, the first fractions are found to be colored red, the middle fractions green, and the final fractions blue. Intermediate fractions are intermediate in color. The development of color follows for each dye compound the typical elimination curve of Figure 2 and the maxima of these curves bear a definite relation to the maxima of desired materials in the oil.

The fractions containing the desired materials such as vitamins can be identified in one of various ways: By matching with a dye that distills at the same temperature, or at a temperature displaced by a known amount; or by bracketing with two dyes, one distilling above, and the other below the maxima of the potent material. Where many fractional distillations have to be performed on one batch of material, it may be convenient to use the bracketing method at one time and the matching method at another. For preliminary research work, the bracketing method is invaluable and will be described first.

Example 1

The bracketing dyes are Celanthrene Red 3B of low boiling point, and Anthraquinone Sky Blue Base, of high boiling point. One part in 10,000 of each is incorporated with a second fraction of a preliminary distillation of cod liver oil, known to be rich in vitamin A ester and in vitamin $D_1$ and $D_2$. The material is distilled in a molecular cyclic batch still at about .001 mm. and yields 13 fractions at temperatures ranging from 90° to 210°. The fractions are colored in the following order:

1. Light red.
2. Dull red.
3. Deepest bright red (maximum).
4. Bright red.
5. Pale red.
6. Palest red brown (minimum).
7. Palest green brown.
8. Emerald green.
9. Deepest blue-green (maximum).
10. Blue-green.
11. Yellow-green.
12. Palest yellow-green.
13. Pale yellow.

The fractions are now assayed biologically and it is found that the vitamin $D_1$ is at its highest concentration in fractions Nos. 6 and 7, which are colored palest red brown to the palest green brown. The vitamin D is thus at highest concentration when both dyes are at least concentration. We must now in this example refer to a series of dyes which has previously been prepared for use at this point. These dyes may be unrelated to one another, except that they form a series of ascending distillation maxima. Preferably, they are related chemically and may be members of a homologous series. The alkylated, or halogenated indigos, form a useful series. So also do the 1:4 dialkylated amino anthraquinone dyes of the type

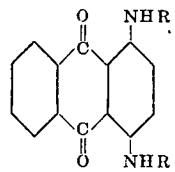

Thus it has been found that the amino-anthraquinones, from methyl to amyl, provide distillation maxima at substantially regular temperature intervals. It is found that in any mixture where the Celanthrene Red 3B and Anthraquinone Sky Blue yield a fraction containing the minimum of each color, that the propyl amino anthraquinone dye, when included, yields its maximum color. The vitamin D, therefore, can be considered to be identified by propyl amino anthraquinone. On redistillation, if a small quantity of the propyl amino anthraquinone is included, the vitamin D will be found in the greatest concentration in those fractions which are deepest in color representing propyl amino anthraquinone. Similarly, the other alkylated anthraquinones can be associated roughly with certain colors in the preliminary red-green dye distillation and should biological assay show a high potency in a sample of particular hue, the appropriate anthraquinone dye can be chosen for following further distillation when once a dye, or a bracketing color has been matched with a vitamin.

Example 2

In this example, only one dye is used, the dye having a distillation maximum, as near as may be predicted to that of the potent material under investigation. Let the potent material in this instance be the vitamin A esters of cod liver oil and let the experimental dye be amino anthraquinone. The dye is then added to a marine oil containing vitamin A and distillation is performed. The fractions are subjected to biological assay, or assay with the vitameter, and it is found that the vitamin A ester is at greatest concentration in those samples which come over after the majority of the blue dye has distilled. By knowing the approximate shape of the color-elimination curve it is ascertained that the dye maximum is occurring at a slightly lower temperature than the vitamin A ester maximum and it becomes possible to estimate with some certainty that the amyl-amino anthraquinone will exhibit a maximum at the same temperature as the vitamin A esters. Further distillations are performed with the use of the amyl dye.

As substantially no tables have been published on the vapor pressure or maximum distillation temperatures of materials under molecular conditions, the selection of a suitable indicator depends to a large extent on trial and experiment assisted by published values of the vapor pressures of the materials at atmospheric and reduced pressures. Molecular weight taken together with chemical constitution and reactivity is a fairly accurate indication of the vapor pressure and, after selecting a material and trying it out experimentally, a lower molecular weight dye will be indicated if the experimental dye exhibited a maximum at too high a temperature and a higher molecular weight dye if the experimental dye came over at too low a temperature. The use of homologous series of various dyes to give maxima at successively increasing temperatures with increase in molecular weight is advantageous.

Small amounts or traces of indicators are usually satisfactory. However, in some cases such as where the indicator is a weak dye or is determined by its refractive index, etc. it is necessary to have larger amounts occur in the distillate in order to make its presence detectable. The addition of larger amounts of the indicator is indicated in such cases.

It may not always be convenient to use a highly dyed distillate and various methods are available for avoiding this. The dyed distillate may be treated with a small amount of charcoal or other absorbent or chemical agent. Alternatively, the bracketing method may be used even for redistillations. More of the two dyes is added to the fraction and distillation is again performed until the colors are eliminated, the colorless portion being known to contain the greatest concentration of potent material.

In the process of my invention any indicator can be used which under the distillation conditions employed exhibits a maximum having a known relation to that of the fraction to be removed. Indicators exhibiting maxima in the neighborhood of that of the desired fraction are useful both for the bracketing method and for those in which a single dye is used. When a single indicator is used however, the identification of the desired fraction is easier and a sharper cut can be obtained if the maximum of the indicator bears a close relation to that of the fraction. Any easily identifiable material can be used as an indicator and while I prefer to employ colored substances such as dyes, other material which can be easily identified by other physical or chemical properties such as refractive index, tendency to crystallize, radioactivity etc. are to be understood as being within the scope of my invention.

Processes of molecular distillation are well known and the conditions of operation have been clearly described by Burch U. S. Patent 1,955,321, Hickman 1,942,858, and 1,925,559, Washburn "Bureau of Standards Jour. Res." 2 (1929) pp. 478–483 and Bronsted et al. "Philosophical Magazine" 43 (1922) pp. 31–49. As a general rule pressures below .1 mm. and preferably below .01 mm. such as between .005 mm. and .0001 are employed. In such processes the distance separating the evaporating and condensing surfaces is less than approximately the mean free path of the residual gas, however, as the path increases with decrease in pressure and elevation of temperature there is no limit to the distance which may be employed providing the pressure and temperature conditions are properly selected for the particular distance used. Usually distances of up to 10 inches such as between ½ and 6 inches have been found to be most satisfactory.

It is to be understood that the expression "fluid mixture of organic compounds" used in the claims includes those which are liquid under the conditions of distillation, although solid under ordinary conditions.

In many industrial molecular distillations, varying amounts of residual gas are present either as a result of incomplete removal or decomposition of distilland and one is never sure to what extent the residual gas is depressing the rate of distillation. The residual gas may raise the distillation temperature of all the substances present and one may be collecting a low boiling substance in mistake for a desired higher boiling material. When the indicators are employed their distillation temperatures are shifted by the appropriate amount and one is able to avoid collecting the wrong fraction. This result is possible even though the pressure of residual gas is above that at which molecular distillation normally takes place. I have also found when operating under pressure conditions which enable molecular distillation that distances of many times the mean free path can be employed if the rate of evaporation is increased by efficient and rapid renewal of the evaporating surface. When operating in this manner it is desirable to have unrestricted space for travel of the vapors to the condensing surface which takes place partly by convection and/or diffusion. Although such processes are not strictly molecular distillation they are to be understood to be within the scope of those distillation processes to which my invention is applicable.

In selecting the temperature to be used consideration must be given to the character of the material to be distilled and the pressures used. Materials of very low volatility must be heated to temperatures approaching their decomposition point even though the lowest pressures attainable are employed. With such compounds temperatures as high as 325° C. are useful. On the other hand the separation of easily volatilizable compounds can be effected at low temperatures such as at room temperature or slightly higher such as up to about 70° C. Most materials have vapor pressures intermediate these two extreme types and I have found that they may be satisfactorily distilled at temperatures of 70° to 300° C. and usually at lower temperatures of between 70° and 250° C. The latter range and especially those temperatures between 90° and 230° have been found to be most satisfactory for the distillation of vitamins from vitamin containing oils.

The important considerations to be observed in selecting a particular dye have been clearly set forth above. Since the process of my invention is a function of the physical properties, any indicator can be used as long as it conforms with the above rules, regarding its molecular weight and/or vapor pressure at the temperature used.

While I have found it convenient to describe my process by reference to specific oils it is broadly applicable to all molecular distillation processes regardless of the material being distilled. Thus it may be applied for instance to the molecular distillation of fat soluble vitamins from animal and vegetable oils, fats, waxes and the like, such as cotton seed and wheat germ oils, tuna, halibut liver, cod liver, turbot, salmon, mackerel, sardine and other fish oils; to the distillation of hormones from oily concentrates and synthetic reaction mixtures thereof; to the distillation of sterols from solid or liquid vegetable and animal fats and waxes; to the removal of high boiling hydrocarbons from petroleum and fractions thereof such as paraffin wax and to the distillation of unsaturated oils such as linseed oil to obtain therapeutic concentrates of unsaturated glycerides.

By the term indicator as used in the specification and claims I intend to designate a substance whose presence in the distillate is readily made known by its chemical or physical properties such as color, light refractive properties, radio activity, tendency to crystallize, etc.

What I claim is:

1. The process of distilling a fluid mixture of organic compounds, at least one of which can be separated from the mixture by high vacuum distillation which comprises adding to the mixture an indicator which is non-reactive with the distilland, which distills in maximum amounts at a temperature having a known definitely predetermined relation to that particular temperature at which the fraction to be separated distills in maximum amounts, subjecting this mixture to high vacuum distillation, and separating said fraction at that particular temperature so denoted by the indicator.

2. The process of distilling a fluid mixture of organic compounds, at least one of which can be separated from the mixture by high vacuum-short path distillation which comprises adding to the mixture an indicator which is non-reactive with the distilland, which distills in maximum amounts at a temperature having a known definitely predetermined relation to that particular temperature at which the fraction to be separated distills in maximum amounts, subjecting this mixture to high vacuum-short path distillation, and separating said fraction at that particular temperature so denoted by the indicator.

3. The process of distilling a fluid mixture of organic compounds, at least one of which can be separated from the mixture by high vacuum distillation which comprises adding to the mixture a colored substance which is non-reactive with the distilland, which distills in maximum amounts at a temperature having a known definitely predetermined relation to that particular temperature at which the fraction to be separated distills in maximum amounts, subjecting this mixture to distillation at a pressure of less than about .1 mm. and separating the fraction at said particular temperature denoted by the temperature at which the colored substance distilled.

4. The process of distilling a fluid mixture of organic compounds, at least one of which can be separated from the mixture by molecular distillation which comprises adding to the mixture a colored substance which is non-reactive with the distilland, which distills in maximum amounts at a temperature having a known definitely predetermined relation to that particular temperature at which the fraction to be separated distills in maximum amounts, subjecting this mixture to molecular distillation, and separating said fraction at that particular temperature so denoted by the indicator.

5. The process of distilling a fluid mixture of organic compounds, at least one of which can be separated from the mixture by high vacuum-short path distillation which comprises adding to the mixture an indicator which is non-reactive with the distilland, which distills in maximum amounts at approximately the same temperature that the fraction to be separated distills in maximum amounts, subjecting this mixture to high vacuum-short path distillation and separating the fraction at approximately the same temperature as that at which the indicator distilled.

6. The process of distilling a member of the group consisting of vegetable and animal oils, fats and waxes in order to separate a component thereof which is distillable under high vacuum-short path distillation conditions which comprises, adding to the oil, fat or wax an indicator which is non-reactive with the distilland, which distills in maximum amounts at a temperature having a known definitely predetermined relation to that particular temperature at which the fraction to be separated distills in maximum amounts, subjecting this mixture to high vacuum-short path distillation, and separating said fraction at that particular temperature so denoted by the indicator.

7. The process of distilling an oil containing a vitamin in order to separate the vitamin content thereof which comprises adding to the oil an indicator which is non-reactive with the distilland, which distills in maximum amounts at a temperature having a known definitely predetermined relation to that particular temperature at which a vitamin present in the oil distills in maximum amounts, subjecting this mixture to short path distillation at a pressure of less than about .1 mm., and separating said fraction at that particular temperature so denoted by the indicator.

8. The process of distilling an oil containing a fat soluble vitamin in order to separate the vitamin content thereof which comprises adding to the oil a colored substance which is non-reactive with the distilland, which distills in maximum amounts at a temperature having a known definitely predetermined relation to that particular temperature at which a vitamin present in the oil distills in maximum amounts, subjecting this mixture to molecular distillation, and separating said fraction at that particular temperature so denoted by the indicator.

9. The process of distilling a fish oil containing a fat soluble vitamin in order to separate the vitamin content thereof which comprises adding to the fish oil a colored substance which is non-reactive with the distilland, which distills in maximum amounts at a temperature having a known definitely predetermined relation to that particular temperature at which a vitamin present in the oil distills in maximum amounts, subjecting this mixture to high vacuum-short path distillation and separating the vitamin fraction at said particular temperature denoted by the temperature at which the colored substance distilled.

10. The process of distilling a fish oil containing a fat soluble vitamin in order to separate the vitamin content thereof which comprises adding to the fish oil an indicator which is non-reactive with the distilland, which distills in maximum amounts at a temperature approximately the same as that temperature at which a vitamin contained in the oil distills in maximum amounts, subjecting this mixture to molecular distillation and separating a fraction containing vitamin at approximately the same temperature as that at which the indicator distilled.

11. The process of distilling an oil containing a fat soluble vitamin in order to concentrate the vitamin content thereof which comprises adding to the oil two colored substances, which is non-reactive with the distilland, one of which distills in maximum amounts at a temperature below that at which a vitamin in the oil distills in maximum amounts and the other distilling in maximum amounts at a temperature above that at which a vitamin in the oil distills in maximum amounts, subjecting this mixture to molecular distillation and separating a fraction containing vitamin at a temperature between those at which the colored substances distilled in maximum amounts.

KENNETH C. D. HICKMAN.